US007063534B2

(12) United States Patent
Hylan

(10) Patent No.: US 7,063,534 B2
(45) Date of Patent: Jun. 20, 2006

(54) DENTAL CART

(76) Inventor: Bradley W. Hylan, 3447 W. 117th St., Cleveland, OH (US) 44111

(*) Notice: Subject to any disclaimer, the term of this patent is extended or adjusted under 35 U.S.C. 154(b) by 124 days.

(21) Appl. No.: 10/780,254

(22) Filed: Feb. 17, 2004

(65) Prior Publication Data

US 2005/0181325 A1 Aug. 18, 2005

(51) Int. Cl.
*A61C 13/38* (2006.01)
*A61G 15/00* (2006.01)

(52) U.S. Cl. ......................... 433/77; 312/209; 312/266

(58) Field of Classification Search .................. 433/77, 433/108, 79, 78; 312/209, 310, 266, 196, 312/197, 202, 301, 305, 307, 308, 249.1, 312/249.2

See application file for complete search history.

(56) References Cited

U.S. PATENT DOCUMENTS

| | | | | |
|---|---|---|---|---|
| 3,304,609 | A * | 2/1967 | Horowitz et al. | 433/78 |
| 3,524,256 | A | 8/1970 | Barker | |
| 4,054,338 | A * | 10/1977 | Martin | 312/249.5 |
| 4,124,262 | A * | 11/1978 | Schill | 312/305 |
| 4,138,815 | A | 2/1979 | Williams et al. | |
| 4,160,323 | A | 7/1979 | Tracy | |
| D272,269 | S | 1/1984 | Voltz | |
| D302,585 | S | 8/1989 | Elliott | |
| 6,056,129 | A | 5/2000 | Ahearn et al. | |
| 2004/0066121 | A1* | 4/2004 | Steadman | 312/310 |

* cited by examiner

*Primary Examiner*—John J. Wilson
*Assistant Examiner*—Meoghan E. MacPherson
(74) *Attorney, Agent, or Firm*—James A. Hudak

(57) ABSTRACT

A dental supply cart comprising a base unit, a top that is rotatable and/or horizontally movable forward and rearward relative to the base unit and an upright open supply cabinet attached to the top is disclosed. The base unit has a number of drawers therein for storage purposes and has articulating arms on the front surface thereof to hold various supply lines and instruments required by the dentist when providing services. A rotating mechanism and/or telescoping track members are interposed between the top and the base unit permitting the top with the supply cabinet thereon to be rotated and/or moved horizontally forward and rearward relative to the base unit. The dental supply cart is typically placed adjacent to or behind the head of the patient so that it is readily available to the dentist while performing the required dental services.

7 Claims, 7 Drawing Sheets

DENTAL CART

TECHNICAL FIELD

The present invention relates, in general, to a supply cart for use by a dentist when providing dental services to patients and, more particularly, to a dental supply cart wherein the top unit thereof is rotatable and/or horizontally movable forward and rearward with respect to its base unit.

BACKGROUND ART

Various types of supply carts are available to dentists when providing dental services to patients. For example, U.S. Pat. No. 4,138,815 (Williams, et. al.) discloses a console unit for use by a dentist or dental assistant. The console unit is comprised of a main cabinet portion with a generally flat work surface thereon. The work surface has a handpiece instrument storage compartment secured to one side thereof. The work surface and the handpiece instrument storage compartment are powered for horizontal frontward and rearward movement and for vertical upward and downward movement so as to position the work surface at the desired position relative to the dentist. A cabinet portion is also provided adjacent the work surface. The main cabinet portion is rotatably mounted to the base portion permitting the positioning of the main cabinet portion, the work surface and the handpiece storage compartment in a desired angular position for use by the dentist. In this case, the main cabinet portion along with the work surface and the handpiece instrument storage compartment rotate relative to the base portion of the unit, which is fixed to the floor. Thus, the console unit disclosed in this patent cannot be readily moved since the base unit is fixed to the floor.

U.S. Pat. No. 6,056,129 (Ahern, et. al.) discloses a dental delivery platform having instrument holders that are milled directly into the solid surface of the platform thus avoiding the creation of corners and crevices that contribute to the retention of contamination. In this case, the platform is not mounted to a base unit and is not readily movable.

U.S. Pat. No. 3,524,256 (Barker) discloses a dental operatory that is arranged to provide separate workspaces for both the dentist and a dental assistant. The workspaces are adjacent either side of the patient and are utilized for dental instruments and supplies. Those instruments and supplies that are not actually in use are located so as to be substantially out of the patient's view but are readily accessible to both the dentist and the dental assistant without either of them having to leave their respective work stations. The work surfaces of the dental operatory disclosed in this reference are not readily rotatable with respect to the base unit and the overall operatory is not readily movable.

U.S. Pat. No. 4,160,323 (Tracey) discloses a portable dental cabinet that can be utilized for mobile dental operations. The cabinet includes a source of compressed air, a vacuum chamber and a vacuum pump. The cabinet disclosed in this reference does not include a rotatable top and/or an upright open supply cabinet attached thereto.

In view of the foregoing limitations of the dental supply cabinets disclosed in these references, it has become desirable to develop a relatively inexpensive dental supply cart that provides a "rear" delivery system with respect to the patient and includes a base unit, a top that is rotatable and/or movable forward and rearward relative to the base unit and an upright supply cabinet attached to the top.

SUMMARY OF THE INVENTION

The present invention solves the problems with presently available dental supply carts, and other problems, by providing a dental cart comprising a base unit, a top member that is rotatable and/or horizontally movable forward and rearward relative to the base unit and an upright open or closed supply cabinet attached to the top member. The base unit has casters on the bottom surface thereof permitting the cart to be readily moved so as to be adjacent to the dentist when providing services. The base unit has a number of drawers therein for storage purposes and has articulating arms on the front surface thereof to hold various supply lines and instruments required by the dentist when providing services. The top member is rotatable and/or horizontally movable forward and rearward with respect to the base unit permitting the top member to be rotated and/or moved laterally relative thereto. The upright open or closed supply cabinet attached to the top member rotates and/or moves forward and rearward therewith and is utilized to provide supplies to the dentist. The dentist would typically place the dental cart adjacent to or behind the head of the patient so that it is readily available to the dentist while performing the required dental services. Thus, the dental supply cart of the present invention provides a "rear" delivery system with respect to the placement of same relative to the patient.

DESCRIPTION OF THE PREFERRED EMBODIMENT

Figure 1:
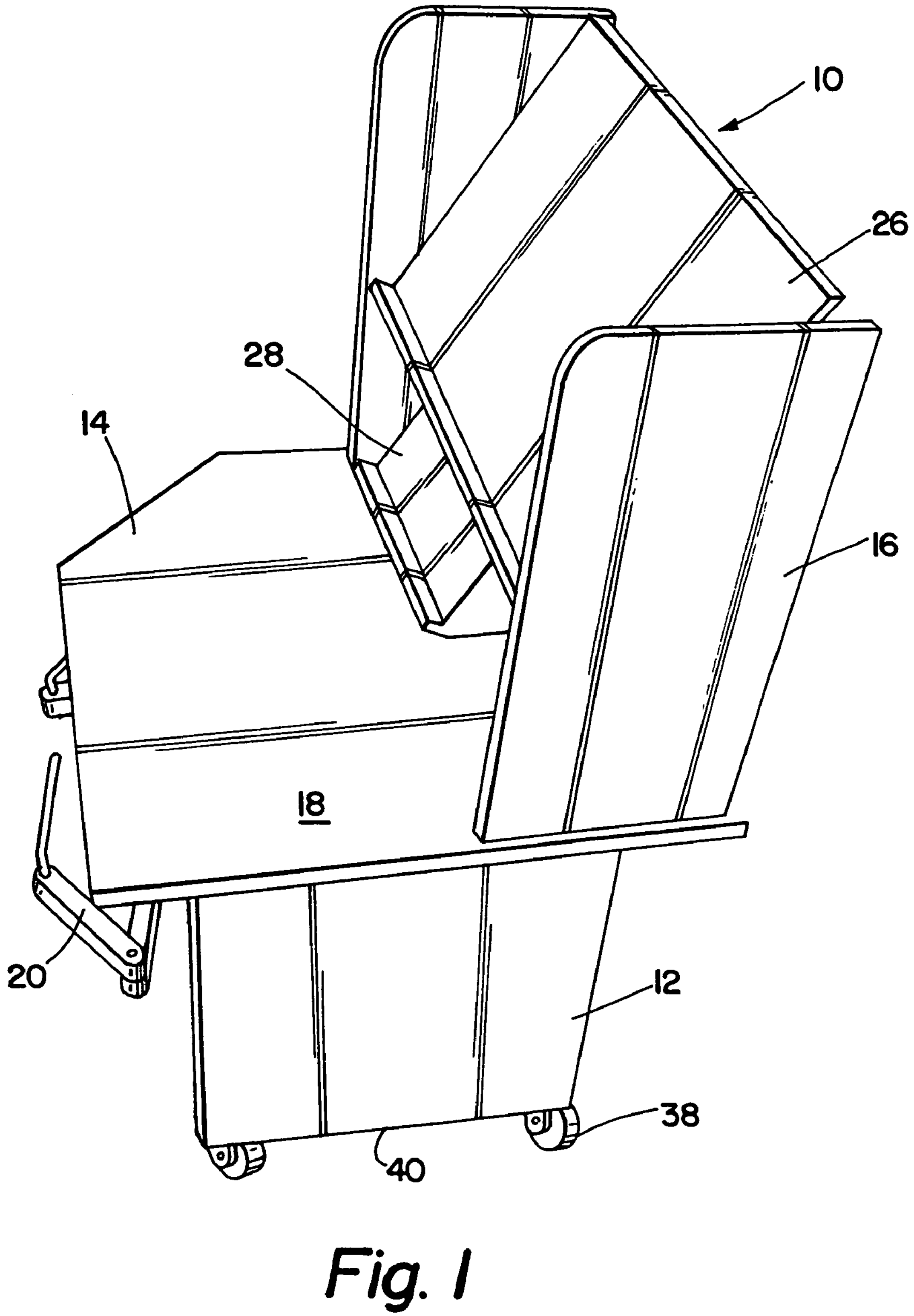
FIG. 1 is a perspective view of the dental cart of the present invention.
Figure 3:
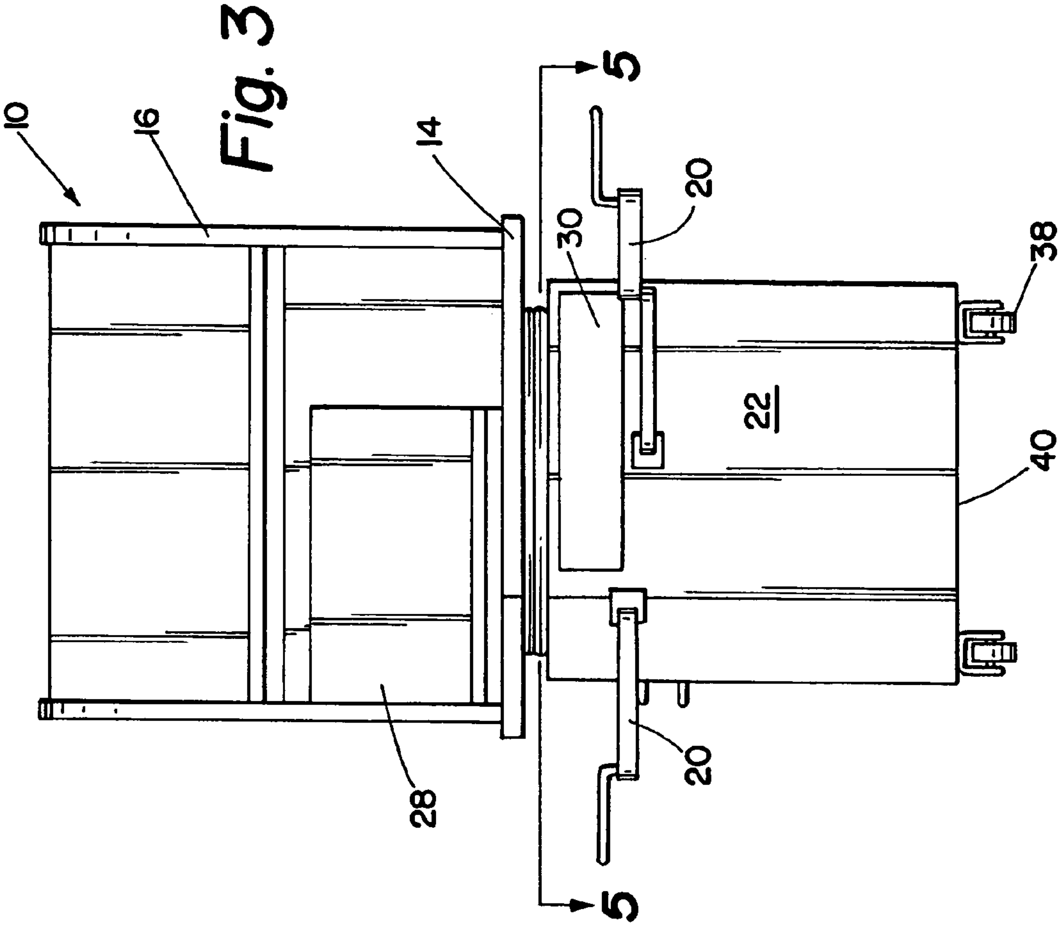
FIG. 3 is a front elevational view of the dental cart of the present invention.
Figure 2:
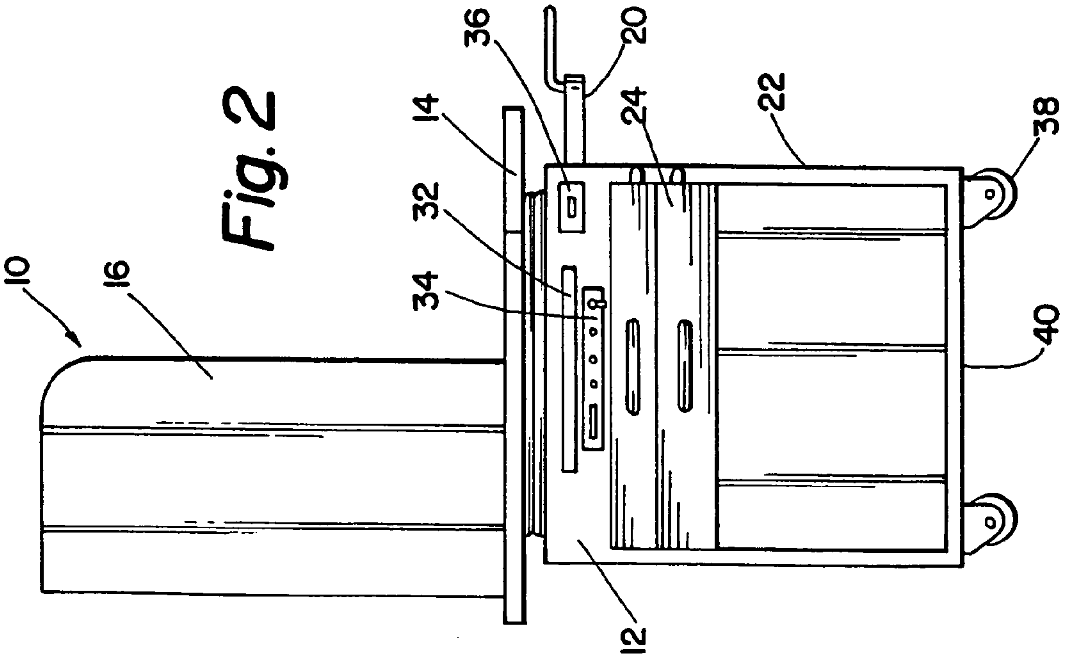
FIG. 2 is a left side elevational view of the dental cart of the present invention.
Figure 4:
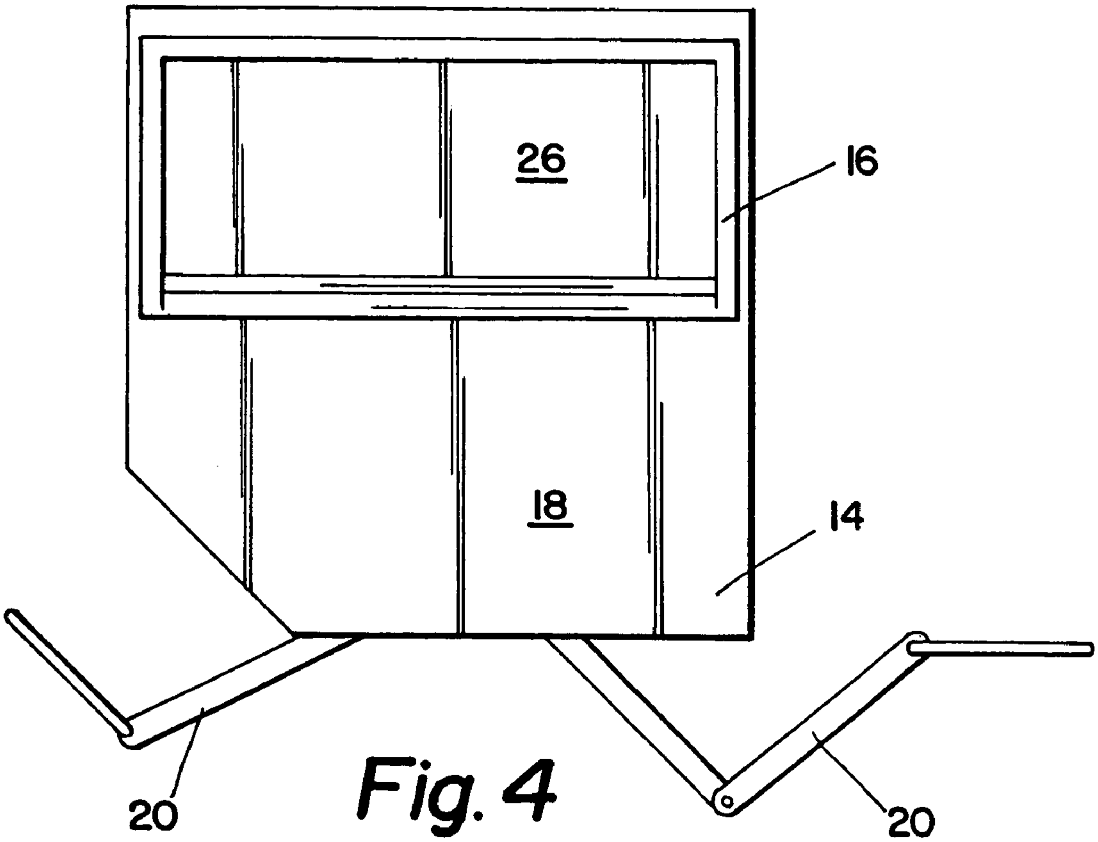
FIG. 4 is a top plan view of the dental cart of the present invention.

Referring now to the drawings where the illustrations are for the purpose of describing the preferred embodiment of the present invention and are not intended to limit the invention described herein, FIG. 1 is a perspective view of the dental cart 10 of the present invention. The dental cart 10 is comprised of a base unit 12, a top member 14 rotatably mounted to the base unit 12 and an upright supply cabinet 16, which may be open or closed, attached to the top surface 18 of the top member 14. One or more articulating arms 20 are attached to the front surface 22 of the base unit 12, as shown in FIG. 3. The articulating arms 20 are utilized to retain dental instruments and supplies (not shown) for use by the dentist. The base unit 12 contains a plurality of drawers 24 which may also contain dental instruments and supplies, as shown in FIG. 2. The drawers 24 are typically oriented so as to be on the left side when facing the dental cart 10 if the dentist is right-handed and are oriented so as to be on the right side when facing the dental cart 10 if the dentist is left-handed. An upper rearwardly inclined shelf 26 and a lower rearwardly inclined shelf 28 are provided in the upright supply cabinet 16, as shown in FIGS. 1 and 3. In addition, a recess 30 is provided in the front surface 22 of the base unit 12 to hold dental supplies and instruments. Also, a laterally movable shelf 32, as shown in FIG. 2, provides an additional work surface for the dentist. The controls for the dental instruments used by the dentist are contained on a control panel 34 located below the laterally movable shelf 32. A power switch 36 for the controls may also be provided. A caster 38 is provided on the bottom surface 38 of base unit 12 adjacent each corner of the base unit 12 permitting the dental cart 10 to be readily moved so as to be adjacent to or behind the head of the patient and to be readily accessible to the dentist while performing the required dental services.

The base unit 12 and the upright supply cabinet 16 can be fabricated from any type of structurally sound, readily cleanable material, such as fiberboard covered with a laminate-type material. The top member 14, which is subjected to wear, can be fabricated from a material that resists scratches and the deposit of any type of chemical material thereon.

Figure 5:
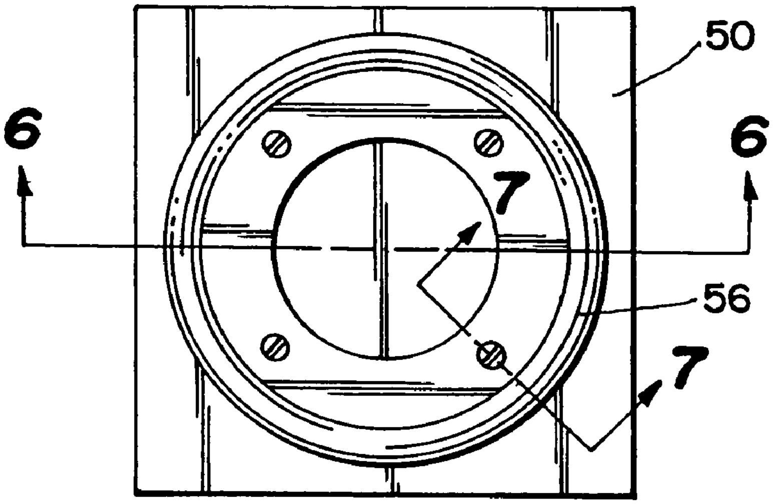
FIG. 5 is a top plan view of the rotating device that rotatably interconnects the base unit with the top member of the dental cart of the present invention.
Figure 6:
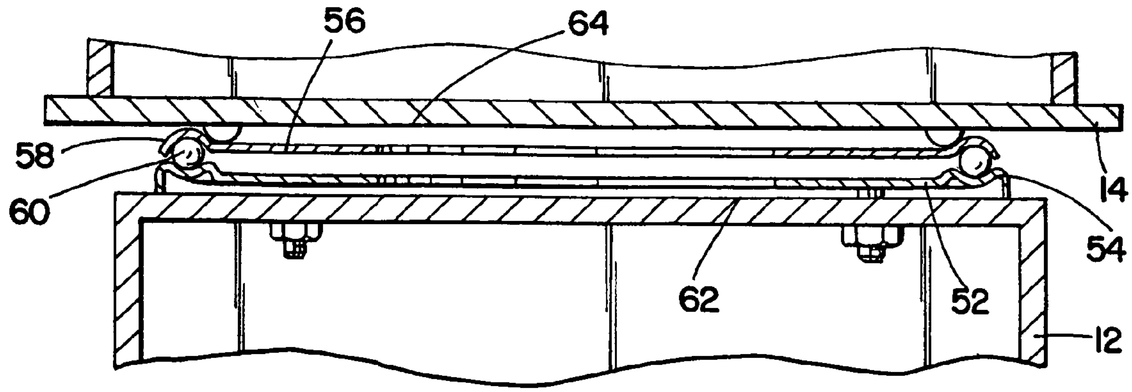
FIG. 6 is a cross-sectional view taken along section-indicating lines 6—6 in FIG. 5.
Figure 7:
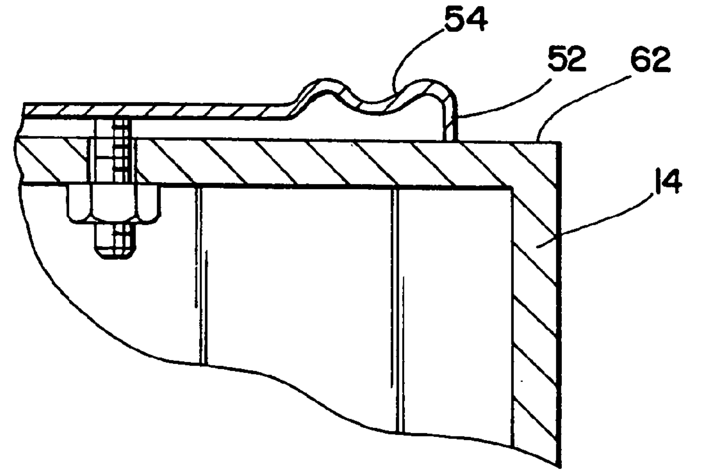
FIG. 7 is a cross-sectional view taken along section-indicating lines 7—7 in FIG. 5.
Figure 8:
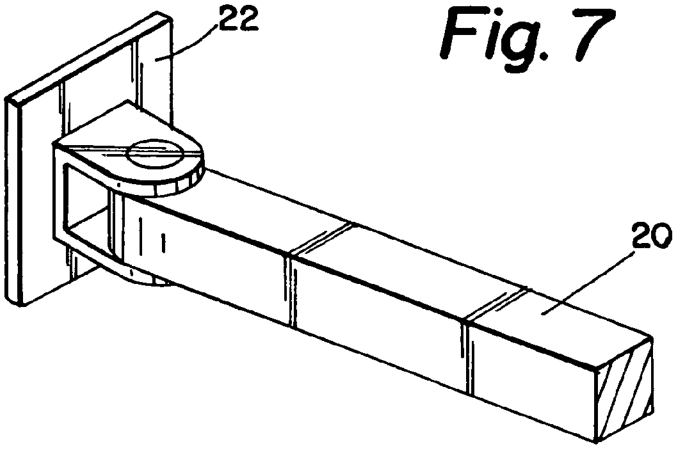
FIG. 8 is a perspective view of an articulating arm mounted to the base unit of the dental cart of the present invention.
Figure 9:
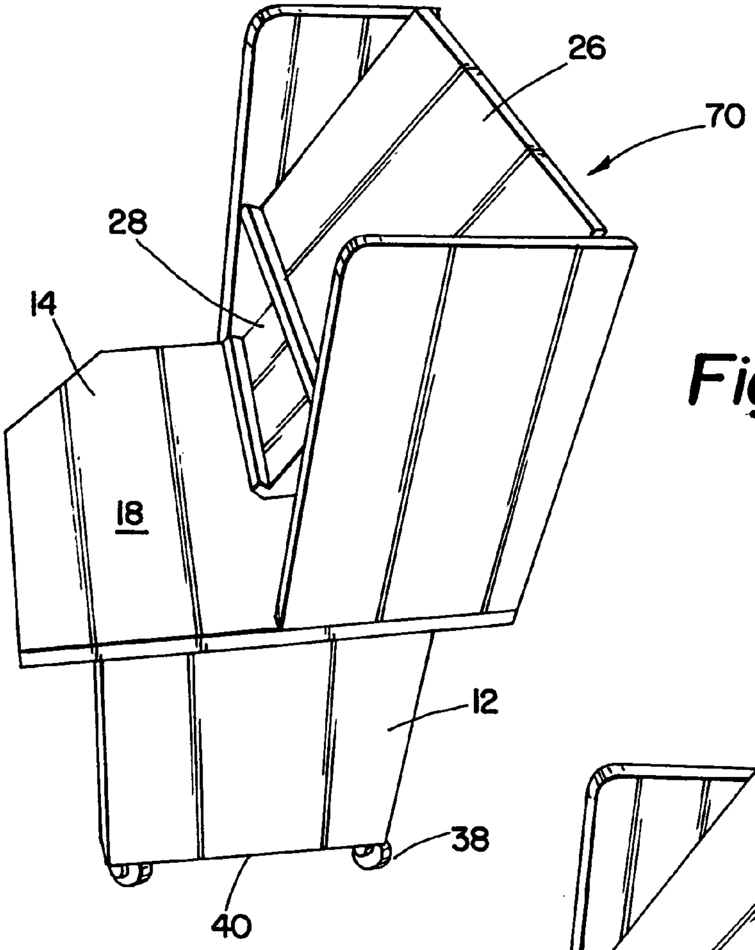
FIG. 9 is a perspective view of another embodiment of the dental cart of the present invention and illustrates the rearward position of the top member and the upright supply cabinet with respect to the base unit of the dental cart.
Figure 10:
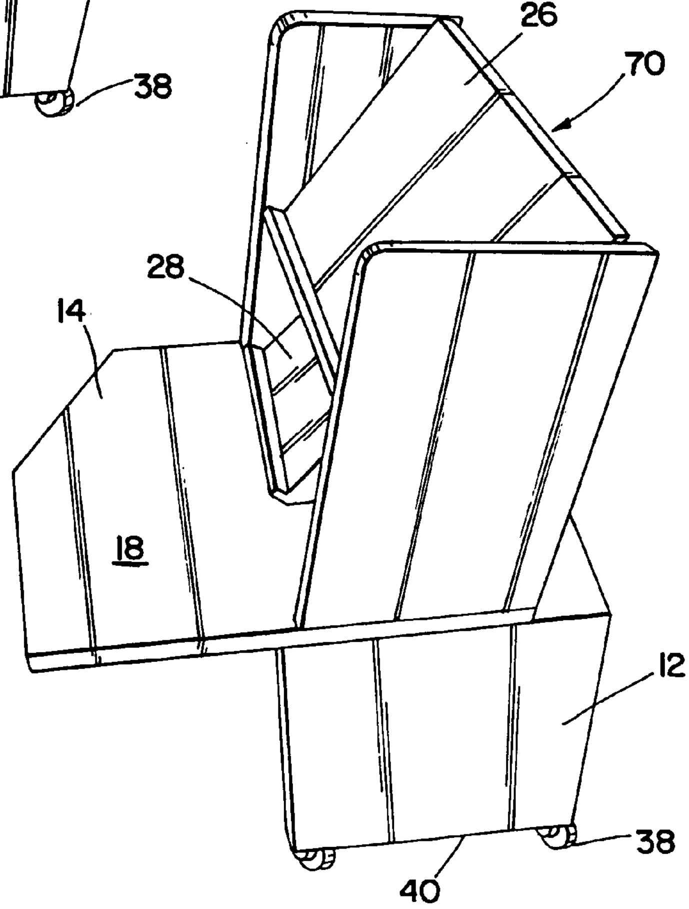
FIG. 10 is a perspective view of the embodiment of the dental cart shown in FIG. 9 and illustrates the forward position of the top member and the upright supply cabinet with respect to the base unit of the dental cart.
Figure 11:
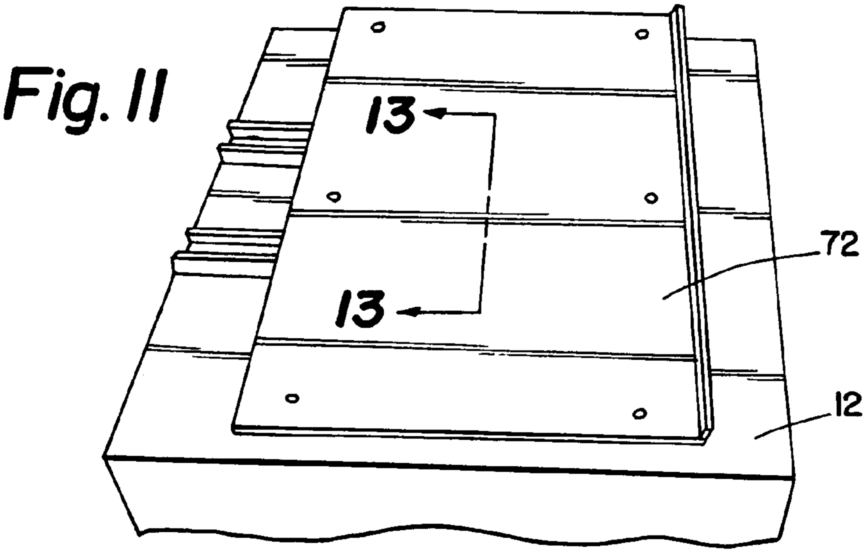
FIG. 11 is a partial perspective view of the base unit and a slidable shelf member of the embodiment of the dental cart shown in FIG. 9 and illustrates the slidable shelf member, which supports the top member and the upright supply cabinet, in the forward position with respect to the base unit.
Figure 12:
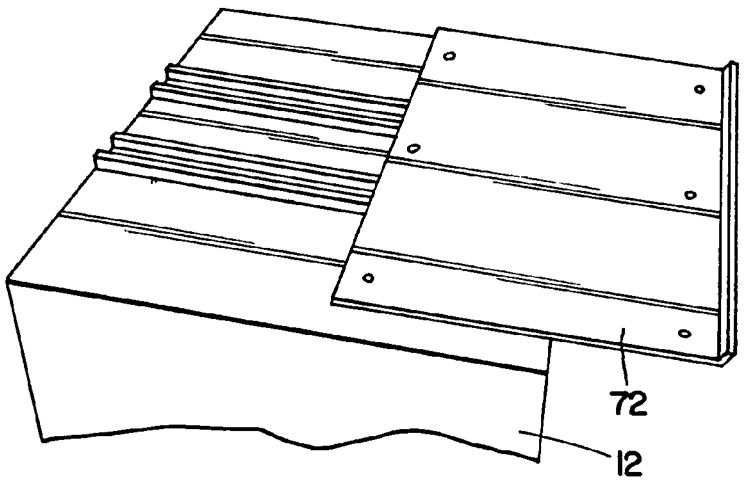
FIG. 12 is a partial perspective view of the base unit and a slidable shelf member of the embodiment of the dental cart shown in FIG. 9 and illustrates the slidable shelf member, which supports the top member and the upright supply cabinet, in the rearward position with respect to the base unit.

The top member 14 is rotatably attached to the base unit 12 by a rotating mechanism 50, such as that shown in FIG. 5–7. The rotating mechanism 40 is comprised of a first circular plate 52 having a first race 54 adjacent the periphery thereof, a second circular plate 56 having a second race 58 adjacent the periphery thereof and a plurality of bearings 60 that are captured between the first race 54 formed in first plate 52 and the second race 58 formed in second plate 56. The first plate 52 is attached to the top surface 62 of the base unit 12 and the second plate 56 is attached to the bottom surface 64 of the top member 14. In this manner, the top member 14 with the upright supply cabinet 16 attached thereto can be readily rotated with respect to the base unit 12 so as to be at the proper orientation with respect to the dentist while utilizing the dental cart 10 for performing dental services. It is understood that other types of rotating mechanisms can be utilized in order to permit the top member 14 with the upright supply cabinet 16 thereon to be rotated with respect to the base unit 12.

Referring now to FIGS. 9–15, another embodiment of the dental cart 70 of the present invention is illustrated. The dental cart 70 is comprised of a base unit 12, a shelf member 72 that is horizontally movable forward and rearward with respect to the base unit 12, a top member 14 rotatably mounted to the shelf member 72 and an upright supply cabinet 16 attached to the top surface 18 of the top member 14. Here again, one or more articulating arms (not shown) are attached to the front surface of the base unit 12. The articulating arms are utilized to retain dental instruments and supplies (not shown) for use by the dentist. An upper rearwardly inclined shelf 26 and a lower rearwardly inclined shelf 28 are provided in the upright supply cabinet 16. A caster 38 is provided on the bottom surface 40 of the base unit 12 adjacent each corner of the base unit 12 permitting the dental cart 70 to be readily moved so as to be adjacent to or behind the head of the patient and to be readily accessible to the dentist while performing the required dental services.

Figure 13:
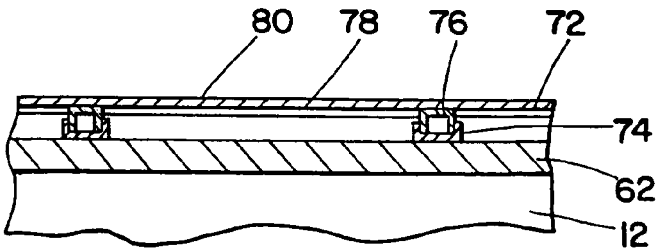
FIG. 13 is a partial cross-sectional view taken across section-indicating lines 13—13 in FIG. 11.
Figure 14:
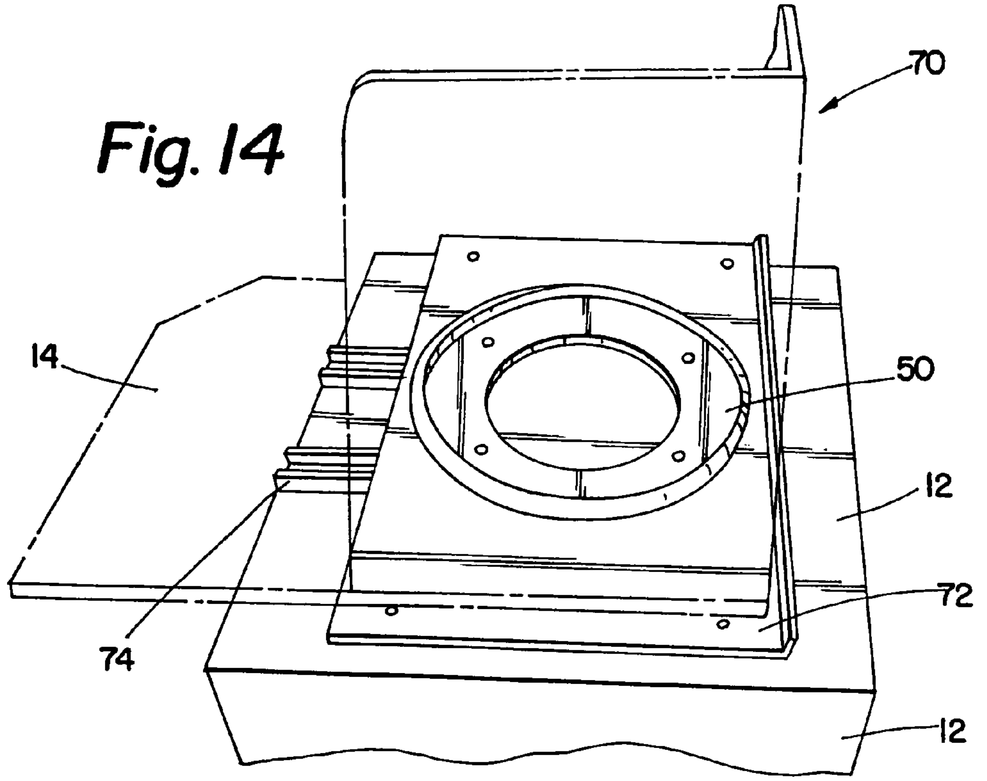
FIG. 14 is a partial perspective view of the embodiment of the dental cart shown in FIG. 9 and illustrates the slidable shelf member that supports the top member and the upright supply cabinet in the non-rotated position with respect to the base unit.
Figure 15:
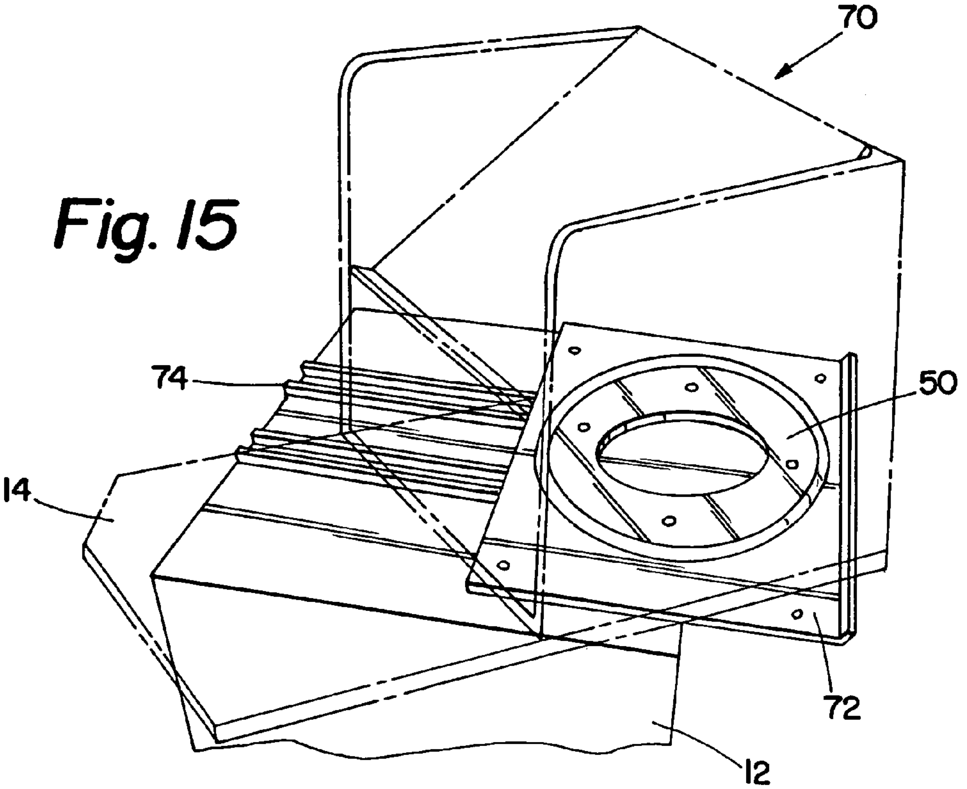
FIG. 15 is a partial perspective view of the embodiment of the dental cart shown in FIG. 9 and illustrates the slidable shelf member that supports the top member and the upright supply cabinet in the rotated position with respect to the base unit.

As shown in FIG. 13, the shelf member 72 is attached to the base unit 12 by two parallel spaced-apart C-shaped telescoping track members 74 each having a slide member 76 therein. The spaced-apart C-shaped telescoping track members 74 are attached to the top surface 62 of the base unit 12 and the slide member 76 for each track member 74 is attached to the bottom surface 78 of the shelf member 72. The top member 14, with the upright supply cabinet 16 thereon, is then rotatably attached to the top surface 80 of the shelf member 72 by rotating mechanism 50. In this manner, the top member 14, with the upright supply cabinet 16 thereon, can be moved horizontally toward or away from the dentist and can also be rotated with respect to the dentist so as to be readily accessible to the dentist while performing the required dental services. Alternatively, it should be noted that the shelf member 72 can be attached to any type of base unit or cabinet member, with or without casters on the bottom surface thereof, permitting the shelf member 72 to be movable forward and rearward with respect to the base unit or cabinet member and permitting the top member 14, with the upright supply cabinet 16 thereon, to be rotated with respect to the base unit or cabinet member.

Certain modifications and improvements will occur to those skilled in the art upon reading the foregoing. It is understood that all such modifications and improvements have been deleted here from for the sake of conciseness and readability but are properly within the scope of the following claims.

I claim:

1. A dental supply cart comprising a base unit, a top member, rotating means interposed between said base unit and said top member, at least one movable slide member interposed between said base unit and said top member, said rotating means and said at least one movable slide member permitting said top member to be rotated and to be moved forward and rearward with respect to said base unit, and a supply cabinet attached to said top member.

2. The dental supply cart as defined in claim 1 wherein said rotating means comprises a first plate having a bearing race therein, a second plate having a bearing race therein, and a plurality of bearings captured between said bearing race in said first plate and said bearing race in said second plate.

3. The dental supply cart as defined in claim 2 wherein said first plate is operably attached to said base unit and said second plate is operably attached to said top member.

4. The dental supply cart as defined in claim 1 further including a shelf member interposed between said at least one movable slide member and said top member permitting said shelf member and said top member to be moved forward and rearward and to be rotated with respect to said base member.

5. A dental supply cart comprising a base unit, a shelf member, at least one movable slide member interposed between said base unit and said shelf member permitting said shelf member to be moved forward and rearward with respect to said base unit, a top member, rotating means interposed between said shelf member and said top member permitting said top member to be rotated relative to said shelf member, and a supply cabinet attached to said top member.

6. The dental supply cart as defined in claim 5 wherein said rotating means comprises a first plate having a bearing race therein, a second plate having a bearing race therein, and a plurality of bearings captured between said bearing race in said first plate and said bearing race in said second plate.

7. The dental supply cart as defined in claim 6 wherein said first plate is operably attached to said shelf member and said second plate is operably attached to said top member.

* * * * *